United States Patent [19]

Schwartz et al.

[11] Patent Number: 4,958,170
[45] Date of Patent: Sep. 18, 1990

[54] MULTIPLE FILM WIDTH TRANSPORT ADAPTOR

[75] Inventors: Bernard A. Schwartz; Tommy L. Tew; Marvin E. Janda, all of Ponca City, Okla.

[73] Assignee: Conoco Inc., Ponca City, Okla.

[21] Appl. No.: 251,603

[22] Filed: Sep. 30, 1988

[51] Int. Cl.$^5$ .................. G03B 17/26; G03B 13/14; B65H 19/04
[52] U.S. Cl. .................. 346/136; 242/55.3; 242/73; 354/343; 354/275
[58] Field of Search .............. 346/136; 354/341, 343, 354/275; 242/55.3, 73

[56] References Cited

U.S. PATENT DOCUMENTS 4,284,995  8/1981  Gordon .................. 346/136

Primary Examiner—Mark J. Reinhart

[57] ABSTRACT

A film supply roll adapter includes a main support through which a rod having a flange on one end for receiving a film roll and another end attached to a cylindrical connector, an open section on the cylindrical connector is adapted to fit on a film roll holder in a laser plotter. The rod is configured within the main support to permit free axial rotation in order to transmit the drag force of the film roll holder directly to the flange with essentially no increase or decrease. The main support is arranged and may be fitted with O-rings to nest within a film roll housing and block all light from being incident on the film.

2 Claims, 3 Drawing Sheets

MULTIPLE FILM WIDTH TRANSPORT ADAPTOR

FIELD OF THE INVENTION

The present invention relates to a laser plotter which selectively exposes film fed from a supply roll and rolled up on a take-up tube and more particularly, the present invention relates to an adapter for use with the supply magazine to permit the use of different film widths.

BACKGROUND OF THE INVENTION

Laser plotters are used extensively in producing transparencies where a large amount of sequentially printed data is involved, such as the production of seismographs.

FIG. 1 illustrates a laser graphics plotter of the type commonly in use in the art. Collimated light source 2 produces a light beam which is focused by lens 3 onto the surface of film 4 as it passes over photodrum 5. Film 4 is unwound from film roll 6 and is wound on take up tube 7 as film 4 is exposed. Take up tube 7 is illustrated as being contained in a light blocking container 8. Similarly, film roll 6 is contained in a housing, usually cylindrical (not shown) which has a diameter closely approximating that of the film magazine with film. Photo drum 5 and take up tube 7 are driven respectively by a stepping motor 9, or the like and torque motor 10.

In a laser graphics plotter, a collimated light source, such as laser, generates a beam of light that ultimately will produce the spots on light sensitive film positioned for exposure in an essentially flat field image plane, the surface of the photodrum. The collimated light beam is applied to a light intensity modulator, the response to the plot data to modulate the intensity of the collimated light beam. An optical assembly is provided between the collimated light source and the light intensity modulator to focus and reduce the beam diameter into the modulator to permit high modulation rates through the light intensity modulator. The modulated beam which exits the modulator passes through a lens which recollimates and focuses the beam to produce the desired spot size on the photodrum.

In some systems, the modulated beam is applied to a rotating multi-facet mirror which scans the modulated light beam across the image plane of the film. Positioned between the rotating mirror and the image plane is a flat field scan lens which provides compensation for the non-linear velocity of the modulated light beam across the image plane and also maintains a constant spot size for each spot plotted.

Wide format laser plotters which plot, in a raster format of consecutive scan lines, selectively position variable intensity spots or dots on light sensitive film positioned for exposure on the photodrum are commonly used in seismograph production. This wide format is traditionally forty two inches wide. The laser plotting systems illustrated uses a stepping motor as the primary motivating force for advancing the film across the photodrum. For these plotters, at the completion of a scan line, the film and film advancing mechanism is moved by pulsing the step motor. When the film is abandoned, the holder on which a film magazine is placed provides a predetermined drag. This drag prevents the film magazine from continuing to rotate when the step motor stops, thus keeping the film tightly wound on the film roll. At the completion of the required number of incremental steps to advance the film, the specified line-to-line separation, the film handling assembly is commanded to stop. To produce a given spot size at the image plane, the modulated laser beam is focused on the image plane to provide the desired spot size at the center of the scan angle interval. The beam diameter at that point is equal to the desired spot size.

Normally, a laser plotter is configured to operate using forty two inch film in the production of seismographs. Although forty two inch width seismographs are commonly in use, narrow widths such as thirty inches have become popular. However, in printing thirty inch seismographs, twelve inches of film are wasted since laser plotters are design to operate only with forty two inch film. The present invention provides a method and apparatus for permitting use of film thirty inches wide or any width less than forty two inches, using conventional laser plotters. As a result, through the use of the present invention, the film may be cut to the desired width of the seismograph which results in less waste and greater efficiency.

SUMMARY OF THE INVENTION

The present invention provides an adapter for use on a laser plotter which permits use of various film widths in addition to the standard forty-two inch film width. The adapter includes an adjustable threaded center rod bridging an end flange for receiving a film roll and a collar having its center internally threaded for reception of the rod. The collar is inserted in one end of a cylinder that has its second end adapted for placement over a film magazine bracket in the laser printer. A support member is arranged so that the rod passes through its center with the rod arranged for unrestricted axial rotation. The support member fits closely against a supply housing to prevent incident light from exposing the film. The support member is arranged so that the drag imposed by the film magazine bracket over which the cylinder is placed is transmitted directly to the end flange.

DESCRIPTION OF THE PREFERRED EMBODIMENT

Figure 1:
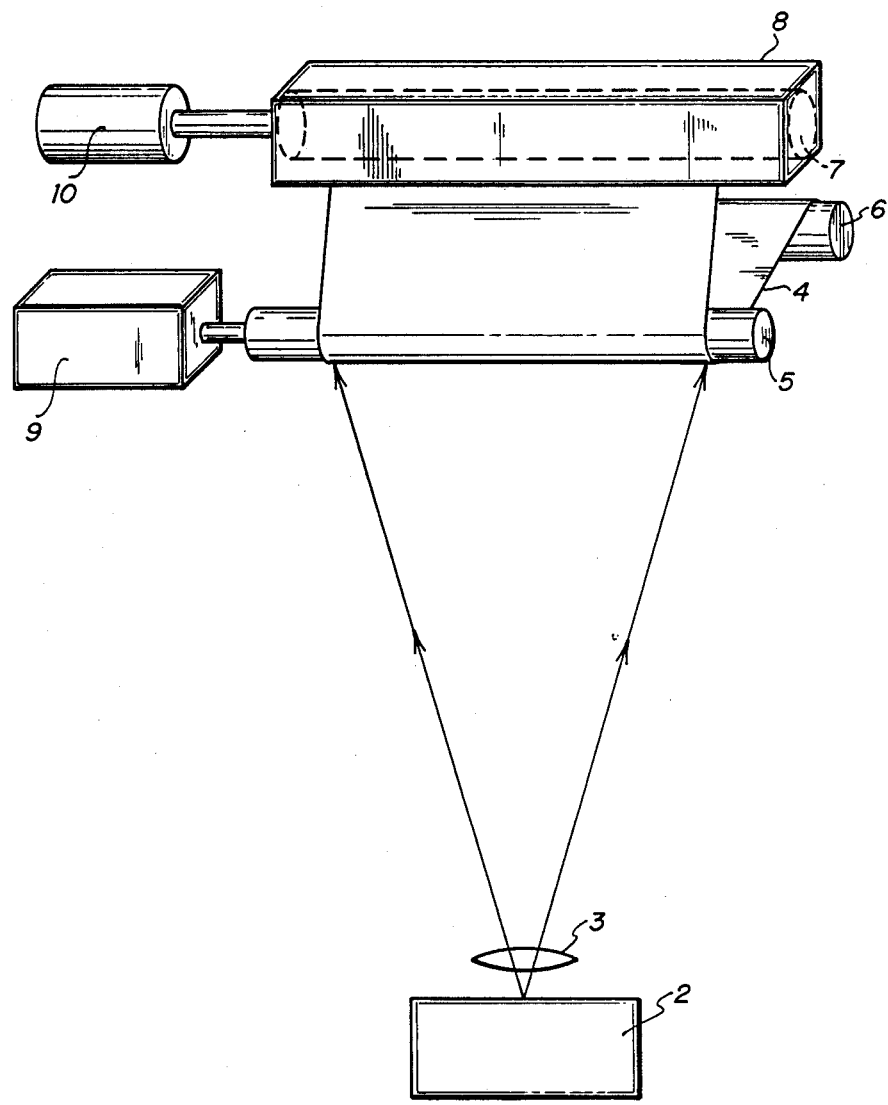
FIG. 1 is an illustration of a laser graphics plotter.

The present invention provides a film magazine adapter which can be used in laser plotters so that a variety of film widths, may be used to plot seismographs or the like. In Figure 1, a laser graphics plotter in which the present invention may be used is illustrated. A more detailed description of this type of laser plotter may be found in U.S. Pat. No. 4,257,053 (Gilbreath) "High Resolution Laser Plotter". The present invention may be used in conjunction with film roll 6 of FIG. 1.

Figure 2:
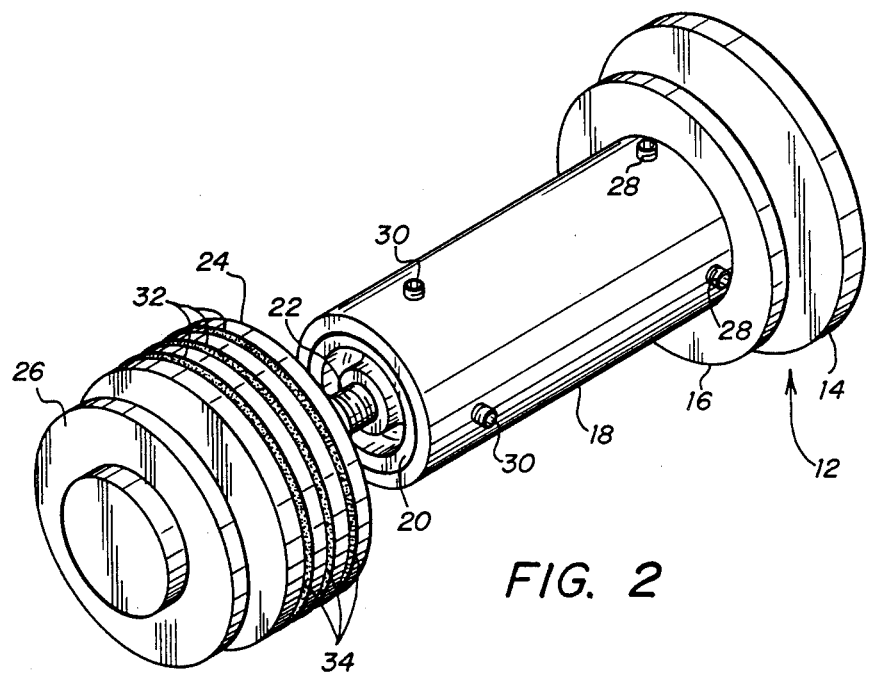
FIG. 2 is an isometric view of a film-width transport adapter.

Referring to FIG. 2, a film width transport adapter is illustrated as connected to a film roll holder 12, which is part of a laser plotter, having two concentric disks, 14 and 16 the innermost of which includes a shelf (see FIG. 3) to which a cylinder 18 is connected. The entire laser plotter on which film magazine bracket 12 is located is not shown for simplicity and since the laser plotter is not part of the present invention. Located within cylinder 18 is machined center piece 20 having threaded center rod 22 screwed therein. Center rod 22 passes through main support 24 and terminates in flange 26 which is adapted for receiving a film roll (see FIG. 2). Cylinder 18 is attached to the shelf of concentric disk 16 by four set screws 28 and to center piece 20 by set screws 30. Main support 24 includes 3 grooves 32, each of which contains an o-ring 34.

Figure 3:
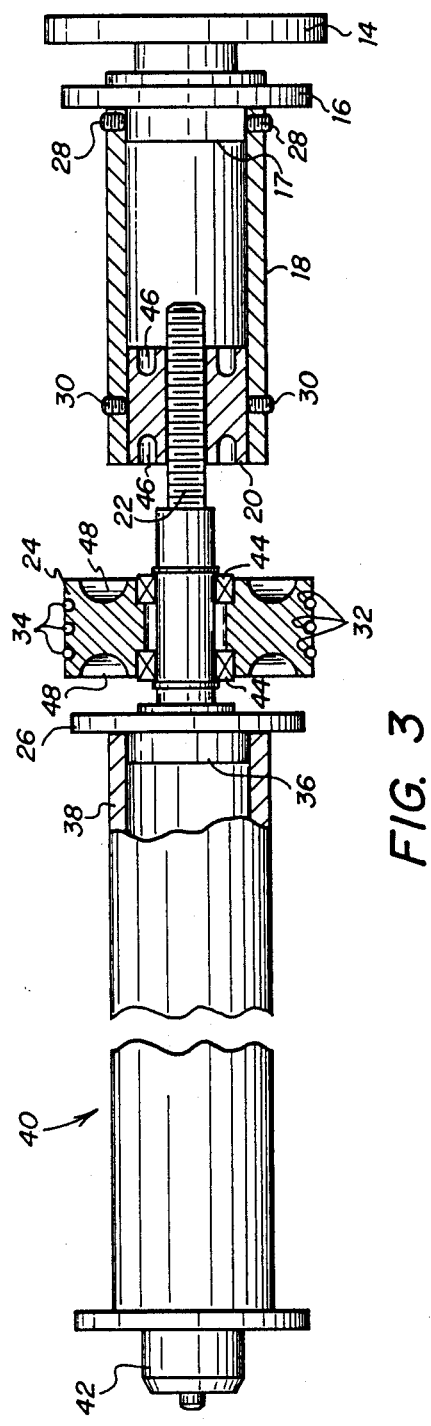
FIG. 3 is a cross-sectional view of the multiple film width transport adapter of FIG. 2.

In FIG. 3 flange 26 is illustrated as having a disk-shaped projection 36 which nestles within a tube 38 around which film is wound, the film and tube 38 comprising film roll 40. The other end of tube 38 fits over film roll holder 42, which is part of a laser plotter, in the same manner as cylinder 18 fits over disk-shaped projection 17 of film roll holder 12.

Main support member 24 is illustrated as having two sets of ball bearings 44 to permit free rotation of rod 22 within main support member 24. However, any means commonly used in the art may be used to replace bearing 44 as long as free axial rotation of rod 22 is permitted. In original equipment manufacturer construction, film roll holders 12 and 42 are set with a predetermined am drag so that the film wound on film roll 40 remains taut during operation. In other words, film is unwound from film roll 40 only through the use of tension placed on the film itself. Tube 38 will not continue to rotate when the tension is released from the film.

Center piece 20 is illustrated as having machined sections 46 to reduce the total weight of the adapter. This is done so that the drag which is pre-set in film roll holders 12 and 42 is not increased. Main support member 24 is illustrated as having machine sections 48 to reduce the overall weight of the the entire film adapter assembly.

Figure 4:
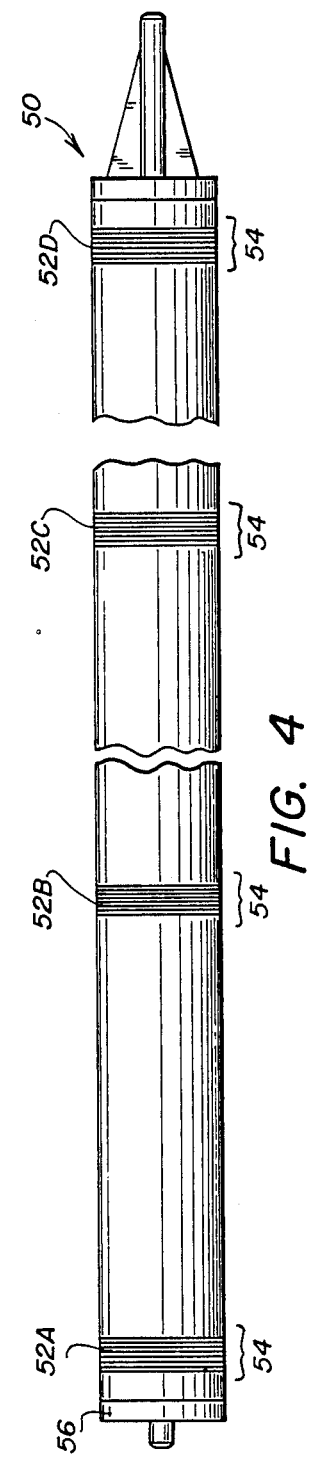
FIG. 4 is a side view of a photo drum.

Referring now to FIG. 4, a photo drum 50 is illustrated as having four sets of grooves 52A, 52B, 52C, and 52D, each containing o-rings 54. Grooves 52A, 52B, 52C, and 52D along with associated o-rings 54 are spaced apart so that they come in contact with the on film which is placed thereon for exposure. Although any separation arrangement may be used which accomplishes this, the separation arrangement of the present invention is that grooves 52A begin approximately nine inches from end 56 of photo drum 50, while grooves 52B begin approximately thirteen point two inches. Grooves 52C begin approximately twenty-eight point three five inches from end 56 and grooves 52D begin approximately forty point four inches away from end 56. The spacing between grooves 52A is set at approximately point one three five inches although any dimension is possible as long as the grooves may be set in place with sufficient room to receive o-rings 54. Similarly, the spacing between grooves located in 52B, 52C and 52D have the spacing of the grooves of 52A.

Figure 5:
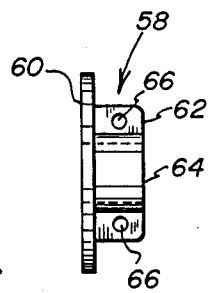
FIG. 5 is a side view of a film take up tube adapter flange.

Referring now to FIG. 5, a side view of a spacer 58 is illustrated. The spacer 58 includes a disk 60 associated with a fastening bracket 62. Center hole 64 is illustrated in phantom. In operation, spacer 58 is attached to a take-up roll such as take up tube 7 illustrated in FIG. 1, used for winding the film after it has been exposed on photo drum 50.

In operation, film width transport adapter is inserted in the film roll 6 so that a film roll having a width less than the full length of the spacing between film roll holders 12 and 42 may be inserted. In operation, main support 24 is arranged so that the drag associated with film roll holder 12 is transmitted directly to tube 38 of film roll 40. During the exposure process, film is unwound from film roll 40, travels over photo drum 50, where it is exposed to light signals representing digital seismic input data and is wound upon a film tube such as film take up tube 7 illustrated in FIG. 1 which includes spacer 58. Spacer 58 is placed on take up tube 7 at a position compatible with the width of the film being used. Spacer 58 is placed over tube 7 and fastened in place with set screws 66. Thus, as the film was exposed, it will be rewound on tube 7 without skewing or spreading across the full length of tube 7.

Most portions of the present invention, such as cylinder 18, center piece 20, center rod 22, main support member 24, and flange 26 are constructed of cast aluminum. However, any light weight, durable material having sufficient strength to withstand the stress of the use which has been described is sufficient.

While the present invention has been described by way of preferred embodiment, it is to be understood that the present invention is not limited thereto, but only by the scope of the following claims.

We claim:

1. A film supply adapter for use in a laser plotter having a cylindrical housing and a film roll holder at each end, said adapter comprising:
   a cylindrical assembly having a first end adapted to be removably connected to one of the film roll holders and a second end including a threaded hollow center area;
   a rod having an axis and one end threaded for insertion into said threaded hollow center area of said cylindrical assembly;
   flange means fixed to the other end of said rod and configured for receiving one end of a film roll; and
   a cylinder having o-rings about its circumference adapted to fit tightly against the inside surface of said cylindrical housing and center hole means for receiving and supporting said rod and permitting axial rotation of said rod.

2. The film supply adapter according to claim 1 wherein said flange means comprises a dual layered disc having a small first circumference and a larger second circumference wherein the small first circumference projects axially from said larger circumference so as to be adapted to hold one end of a film roll.

* * * * *